United States Patent

Yamashita et al.

[11] 3,950,081
[45] Apr. 13, 1976

[54] PERISCOPE-TYPE VIEW MIRROR APPARATUS FOR AUTOMOBILE

[75] Inventors: Makoto Yamashita, Ayase; Masagoro Kushida, Isehara; Fumio Niitsuma, Hatano; Masao Enomoto, Yokohama; Akira Miyamoto, Tokyo, all of Japan

[73] Assignee: Ichikoh Industries Limited, Tokyo, Japan

[22] Filed: Feb. 25, 1974

[21] Appl. No.: 445,333

[30] Foreign Application Priority Data
Feb. 26, 1973 Japan.............. 48-22226
Feb. 26, 1973 Japan.............. 48-22227

[52] U.S. Cl. ............ 350/302; 350/301; 350/307
[51] Int. Cl.² ...................................... G02B 5/08
[58] Field of Search ........... 350/301, 302, 307, 299

[56] References Cited
UNITED STATES PATENTS

| | | | |
|---|---|---|---|
| 3,058,395 | 10/1962 | Mattsson | 350/302 |
| 3,463,578 | 8/1969 | Smith | 350/302 |
| 3,704,062 | 11/1972 | Toy | 350/302 X |
| 3,784,288 | 1/1974 | Toy | 350/302 |
| 3,788,735 | 1/1974 | Rowley | 350/302 |

FOREIGN PATENTS OR APPLICATIONS

| | | | |
|---|---|---|---|
| 2,051,897 | 4/1972 | Germany | 350/302 |
| 464,260 | 6/1951 | Italy | 350/302 |

Primary Examiner—John K. Corbin
Assistant Examiner—F. L. Evans
Attorney, Agent, or Firm—Wenderoth, Lind & Ponack

[57] ABSTRACT

A periscope-type rear view mirror apparatus for automobiles is disclosed. The apparatus includes a roof-top planar objective mirror positioned above an aperture formed in the roof of the driver's chamber of an automobile for reflecting forwardly and downwardly the light rays coming from the rear of the automobile into the driver's chamber, a first planar reflecting mirror positioned in the driver's chamber for reflecting forwardly and upwardly the light rays reflected by the objective mirror, and a second planar reflecting mirror positioned close to the first reflecting mirror for reflecting the light rays reflected by the first reflecting mirror to the eyes of the driver. The first reflecting mirror is supported by a pivotably hinged holder to allow the vertical angular adjustment of the holder, whereby the first reflecting mirror can be used as an ordinary rear view mirror of the type normally installed in the driver's chamber.

2 Claims, 12 Drawing Figures

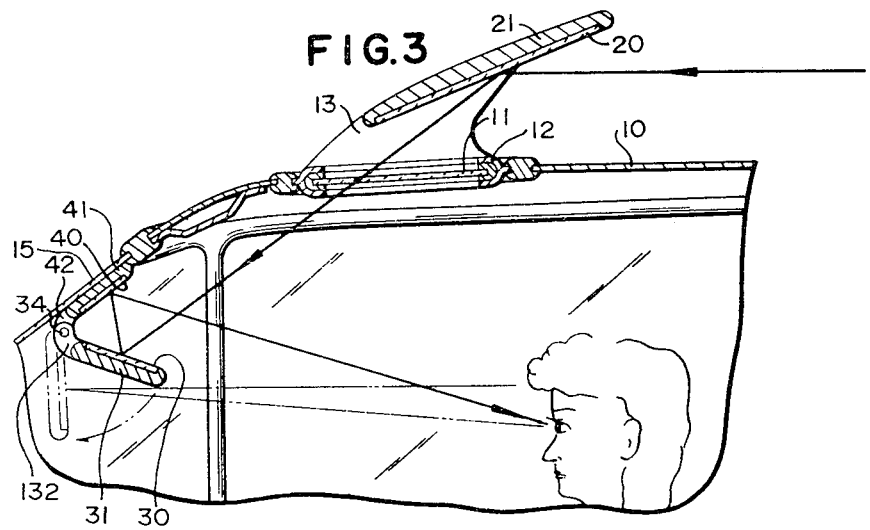
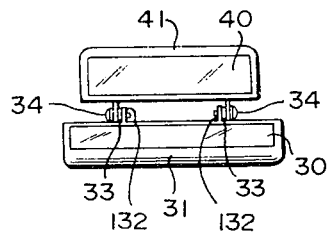
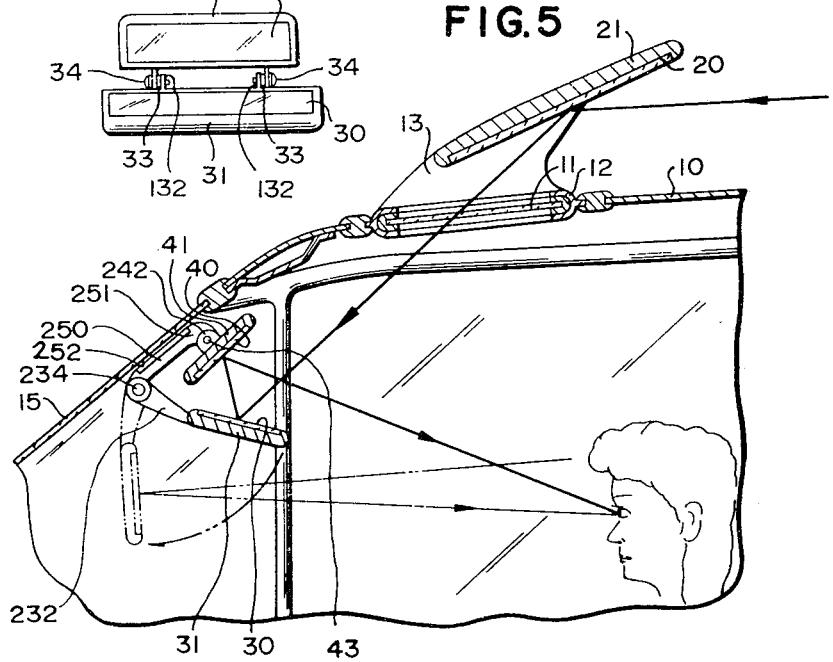

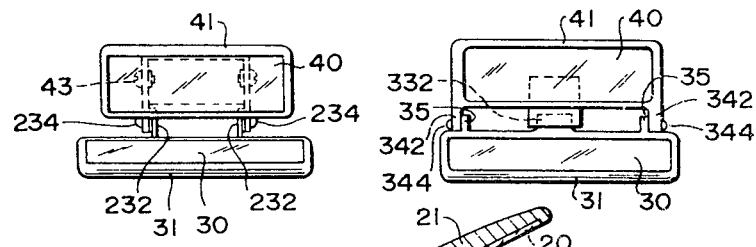

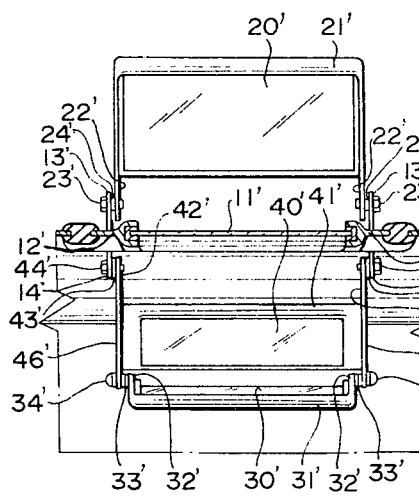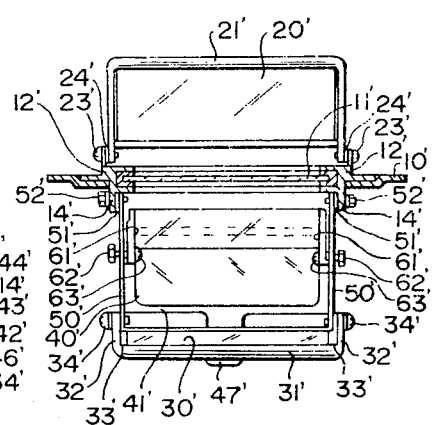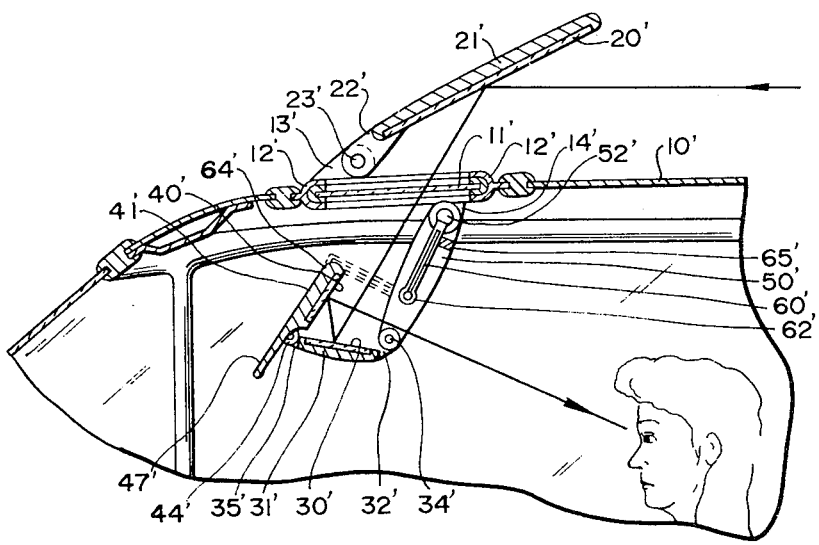

PERISCOPE-TYPE VIEW MIRROR APPARATUS FOR AUTOMOBILE

BACKGROUND OF THE INVENTION a. Field of the Invention

The present invention pertains to a periscope-type rear view mirror apparatus for automobiles arranged so as to obtain a rear view by the use of three planar mirrors.

b. Description of the Prior Art

In known periscope-type rear view mirror apparatus, the housing for accommodating an objective mirror projects from the roof of the driver's chamber for a substantial distance, which not only is not desirable from the viewpoint of design but also causes increased wind resistance during driving. Furthermore, in such a known apparatus, the positions of the visual fields at the respective mirror surfaces of the reflecting mirror and the objective mirror undergo substantial changes as the position of the eyes moves frequently. Accordingly, it has been necessary to provide both an objective mirror and a reflecting mirror, each having the large size, in order to cover the movements of the line of vision. Thus, the apparatus as a whole tended to be large. This, in turn, is quite disadvantageous from the viewpoints such as the efficiency in attaching the apparatus to the body of the automobile, design and cost.

Also, because the reflecting mirror has a substantially large size as stated above, there arises difficulty in gaining access to the objective mirror and the window thereof when it is desired to clean these members.

Because of the foregoing circumstances, a proposal has been made to provide a periscope-type rear view mirror apparatus of compact size by the combined use of a convex lens and a concave mirror. Such an optical system, however, will cause changes in the magnification of the image or cause distortion of the image or cause disappearance of the image as the position of the driver's eyes changes. Moreover, the convex lens or the concave mirror requires a very high degree of precision in order to eliminate the distortion of the image. In addition, their combination and arrangement require a high degree of precision. As a result, a periscope-type rear view apparatus having such an optical system will have costly parts and will have poor productivity, resulting in a cost which is at least several times higher than the cost of manufacture of a periscope-type rear view mirror apparatus employing planar mirrors.

In order, therefore, to solve the foregoing various problems, the inventors developed a periscope-type rear view mirror apparatus for automobiles having an optical system comprising an objective mirror positioned on top of the roof of the driver's chamber for reflecting forwardly and downwardly the light rays coming from the rear side of the automobile into the driver's chamber, a reflecting mirror positioned substantially horizontally in the driver's chamber for reflecting upwardly and forwardly the light rays reflected by the objective mirror, and an eye-piece mirror positioned close to the reflecting mirror and having a mirror surface crossing the reflecting mirror obliquely at a sharp angle for directing the light rays reflected by the reflecting mirror to the position of the eyes of the driver, and filed a patent application under U.S. Ser. No. 426,691. In this periscope-type rear view mirror apparatus of such application, the reflecting mirror is provided within the driver's chamber and therefore the height of the protruding objective mirror can be arranged to be lower than the height of the conventional apparatus of periscope-type.

However, the periscope-type rear view mirror apparatus described in the aforesaid application has the disadvantage that it is impossible to use this apparatus as an ordinary rear view mirror of the room type when there is no need of using it as a periscope-type rear view mirror apparatus. More specifically, in order that this periscope-type rear view apparatus be more advantageous and simple to use, it should be arranged so that this apparatus can also be used as an ordinary rear view mirror apparatus whenever there is no need of using it as a periscope-type apparatus.

SUMMARY OF THE INVENTION

It is, therefore, a primary object of the present invention to provide a periscope-type rear view mirror apparatus having the aforesaid optical system but arranged so that, when there is no need to use this apparatus as a periscope-type, either one of the reflecting mirrors can be used as an ordinary rear view mirror which reflects light rays coming directly through the rear window of the automobile.

Another object of the present invention is to make the attachment of both the first and the second reflecting mirrors easy.

Still another object of the present invention is to provide an apparatus of the type described above wherein the positions of the reflecting mirrors and/or the objective mirror can be shifted quite easily to keep them from hindering the driver's vision during driving.

BRIEF DESCRIPTION OF THE DRAWINGS

FIGS. 3 and 4 are a central vertical sectional view and a front view, respectively, showing a second example of the present invention.

FIGS. 5 and 6 are a central vertical sectional view and a front view, respectively, showing a third example of the present invention.

FIGS. 7 and 8 are a central vertical sectional view and a front view, respectively, showing a fourth example of the present invention.

FIGS. 9 and 10 show a fifth example of the present invention, in which FIG. 9 is a central vertical sectional view and FIG. 10 is a front view.

FIGS. 11 and 12 show a sixth example of the present invention, in which FIG. 11 is a central vertical sectional view and FIG. 12 is a front view.

DETAILED DESCRIPTION OF THE PREFERRED EMBODIMENTS

Figure 1:
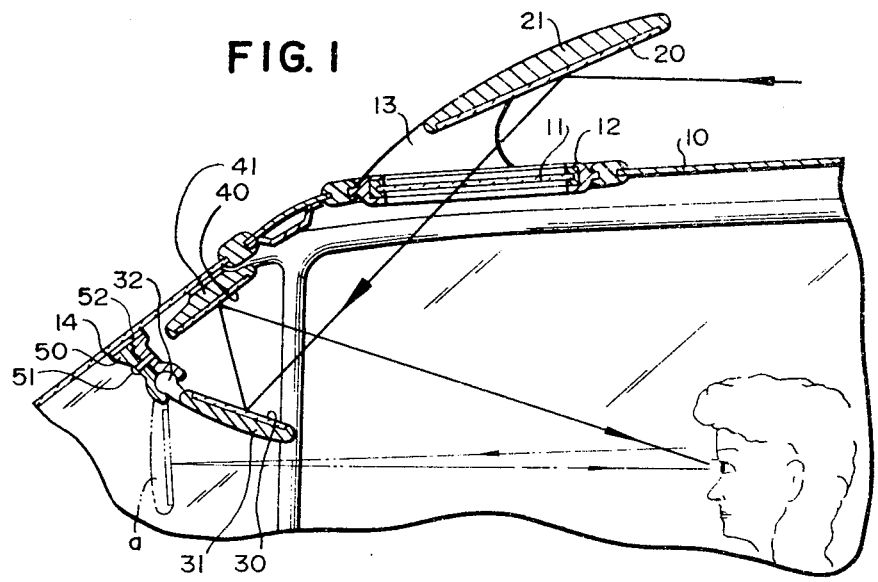
FIGS. 1 and 2 are a central vertical sectional view and a front view, respectively, showing a first example of the present invention.
Figure 2:
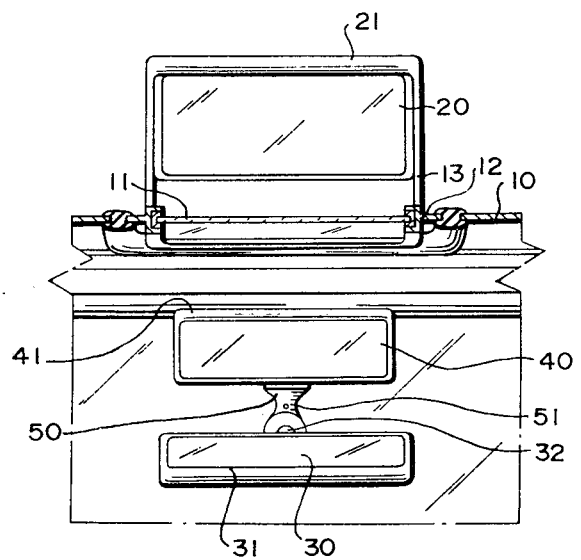

FIGS. 1 and 2 show a first example of the periscope-type rear view mirror apparatus for an automobile according to the present invention.

A housing 21 of an objective mirror 20 is secured between a pair of stays 13 extending upwardly from the opposite edges of a frame 12 of a glass pane 11 which covers an aperture formed in the roof 10 of the driver's chamber. In this example, the frame 12, the stays 13 and the housing 21 are moulded together as an integral component body before assembling the parts into a complete rear view mirror apparatus.

The holding member 31 of the first reflecting mirror 30 is hinged to a stay 50 which is bonded to the inner surface of a front windshield 14 in such a way that the holding member 31 can be pivoted to change its angular position relative to the stay 50. More specifically, a pivot 32, having a globular head portion, is secured to the forward end of the holding member 31 and the stay 50 is composed of two upper and lower members which are fastened together by a screw 51 in such a way that the receiving portion which is provided at the open end of the stay nips the pivot 32 therein for pivotal movement. The stay 50 is bonded to the inner surface of the windshield 14 by means of a two-face adhesive tape 52. The holding member 41 of the second reflecting mirror 40 is bonded at its rear surface directly to the inner surface of the windshield 14.

As stated above, because the housing 21, the stays 13 and the frame 12 (having a glass pane 11) are provided in an integral body, this integral body can be easily attached to the roof of the driver's chamber. Also, both the first reflecting mirror 30 and the second reflecting mirror 40 can be easily secured to the inner surface of the windshield 14 by the use of two-face adhesive tape strips. Furthermore, the positions of the attachment of the first reflecting mirror 30 and the second reflecting mirror 40 can be altered as desired, whereby the angle of the first reflecting mirror 30 can be freely adjusted so that this apparatus as a whole be attached to any type of automobile. With the aforesaid arrangement, the first reflecting mirror 30, may be pivoted to the position indicated by phantom line α for use as an ordinary rear view mirror which reflects the light rays coming directly through the rear window of the automobile. The objective mirror 20 is exposed to the air current passing through the space between the stays 13 and thus its mirror surface does not tend to become soiled with foreign particles. Moreover the glass pane 11 can be easily cleaned.

FIGS. 3 and 4 show a second example of the periscope-type rear view mirror apparatus for automobiles according to the present invention.

In this example, the arrangement of the objective mirror 20 and the glass pane 11 is identical with the arrangement of the first example. The difference lies in the arrangement of the first reflecting mirror 30 and the second reflecting mirror 40.

More specifically, the holding member 41 of the second reflecting mirror 40 is bonded, at its rear surface, directly to the inner surface of the windshield 15. Two parallel, flat lugs 42 project from the lower edge of this holding member 41. Two parallel, flat lugs 132 project from the forward edge of the holding member 31 of the first reflecting mirror 30. These latter lugs 132 are tightly connected to the aforesaid lugs 42 by bolts 34 via washers 33.

As a result, the angle of the first reflecting mirror 30 in the vertical direction can be adjusted. Thus, it is possible to obtain a rear view mirror apparatus which functions in a substantially identical manner to that of the first example. In addition, according to this second example, the operation of bonding these two reflecting mirrors to the windshield 15 can be completed in one step unlike the two-step operation required in the first example. Therefore, the attachment operation can be more readily performed.

FIGS. 5 and 6 show a third example of the periscope-type rear view mirror apparatus for automobile according to the present invention.

In this example, the arrangement of the objective mirror 20 and the glass pane 11 is the same as that of the first example. The difference lies in the arrangement of the first reflecting mirror 30 and the second reflecting mirror 40.

More specifically, onto the inner surface of the windshield 15 is bonded only a bracket 250 which has been moulded separately from the holding members 31 and 41 of the respective reflecting mirrors. Two parallel, flat lugs 242 project from the rear side of the holding member 41. These lugs 242 are hinged to two parallel, flat lugs 251 projecting from the upper edge of bracket 250 by bolts 43 via washers. The holding member 31 has, at its forward edge, two projecting parallel, flat lugs 232. These lugs 232 are hinged, by bolts 234 and via washers, to two parallel, flat lugs 252 projecting from the lower edge of the bracket 250.

In the rear view mirror apparatus having the aforesaid arrangement, the attachment operation of these component members to the windshield 15 can be completed in one step. Thus, it provides an effect substantially the same as that of the second example. Moreover, the second reflecting mirror 40 can be adjusted in its angular position in the vertical direction, and accordingly, the apparatus of the instant example is superior to the preceding examples in its adaptability to the varying condition of the visual field.

FIGS. 7 and 8 show a fourth example of the periscope-type rear view mirror apparatus according to the present invention.

The arrangement of the objective mirror 20 and the glass pane 11 of this example is the same as that of the first example. However, there is a difference in the arrangement of the first reflecting mirror 30 and the second reflecting mirror 40.

More specifically, a columnar pivot 332 projects from substantially the central region of the forward edge of the holding member 31. This columnar pivot 332 is nipped by the foremost end of a stay 350 which, in turn, is bonded to the inner surface of the windshield 15. Thus, the holding member 31 of the first reflecting mirror 30 is hinged for vertical angular adjustment. This stay 350 is arranged in the same manner as the stay of the first example, i.e., two upper and lower members are fastened together by a screw 351. Also, two parallel, flat lugs 35 project forwardly from both lateral portions of the forward edge of this holding member 31. Two parallel, flat lugs 342 project downwardly from the lower edge of the holding member 41 of the second reflecting mirror 40 and are hingedly connected to lugs 35 by bolts 344.

The rear view mirror apparatus having the foregoing arrangement provides an effect which is about the same as that obtained in the third example.

The rear view mirror apparatus described in the foregoing examples are quite simple to attach and can be attached to any type of automobile. In addition, one of the reflecting mirrors can be used as an ordinary rear view mirror depending upon the circumstances.

Description will next be made of an instance where the aforesaid apparatus is used as an ordinary mirror, with respect to an example in which the objective mirror and one of the reflecting mirrors, both of which are then no longer necessary, are shifted from their operative positions to keep them from hindering the vision of the driver.

Such hindrance can be avoided by the use of the periscope type rear view mirror apparatus of the present invention, as shown in a fifth example. The detailed structure of this example is shown in FIGS. 9 and

10.

In this latter example, the roof 10' of the driver's chamber is provided with an aperture which, in turn, is blocked by a glass pane 11' to prevent rain or water from entering therein. The forward portions of the opposing lateral edges of the frame 12' which supports this glass pane 11' are extended upwardly and downwardly to provide supporting lugs 13' and 14', respectively.

The objective mirror 20' utilizes a glass pane having a breadth substantially the same as that of the glass pane 11' and is supported by a holding member 21'. This holding member 21' is tightly secured to the rear side of the objective mirror 20'. The bilateral edges of the holding member 21' extend downwardly from their opposing lower edges to provide two parallel, flat lugs 22'. These lugs 22' are fastened to the supporting lugs 13' by bolts 23', respectively, each of which has a shank which extends horizontally and perpendicular to the direction of advancement of the automobile. Between each lug 22' and each supporting lug 13' is interposed a washer 24' having a predetermined friction coefficient.

Because of this arrangement, the objective mirror 20' can be supported for vertical angular adjustment relative to the body 10' of the vehicle. On the other hand, air currents pass through the space between the two lugs 22' while the automobile is being operated. This current then flows along the mirror surface, so that this mirror surface does not tend to be soiled by foreign particles. Moreover, when it is not intended to use this objective mirror, the latter can be pivoted downwardly so as to be brought into tight contact with the roof top 10' of the vehicle.

Holding member 41' is hingedly connected to the supporting lugs 14' for holding the second reflecting mirror 40'. More specifically, the edges of the holding member 41' of the second reflecting mirror 40' are extended upwardly to provide two parallel, flat lugs 42'. These lugs 42' are fastened together to the supporting lugs 14' by bolts 44' which are parallel to the aforesaid bolts 23'. A washer 43' is interposed between each lug 42' and each supporting lug 14'.

The edges of the holding member 41' are extended downwardly also to provide two parallel, flat lugs 46'. To these lugs 46' is hinged the holding member 31' for holding the first reflecting mirror 30'. More specifically, the edges of the holding member 31' are extended forwardly to provide two parallel, flat lugs 32'. These lugs 32' are fastened to the lugs 46' by bolts 34', respectively, which are parallel to said bolts 44', via washers 33'.

Because of this arrangement, both the first reflecting mirror 30' and the second reflecting mirror 40' can be supported for vertical angular adjustment relative to the body of the automobile.

Accordingly, the first reflecting mirror 30' is pivoted downwardly as shown by the phantom line a so that it may be used to reflect the light rays coming directly through the rear window whereby this reflecting mirror 30' can be used as an ordinary rear view mirror. In case it is intended to use this first reflecting mirror 30' as an ordinary rear view mirror, neither the objective mirror 20' nor the second reflecting mirror 40' are necessary. In such a case, however, the objective mirror 20' and the second reflecting mirror 40' can be folded, respectively, as stated above. The objective mirror 20', when folded, will be brought into tight contact with the surface of the roof 10'. In such a folded position there will not be any increase in the resistance to the wind pressure during driving.

Also, in this example, the first reflecting mirror 30' and/or the second reflecting mirror 40' are both hinged. Therefore, when the driver bumps either one or both of the reflecting mirror 30' and the second reflecting mirror 40' with his head in an accident or for some other reason, these hinged mirrors will freely move in the same direction as the impact to thereby mitigate the amount of impact, and as a result an injury may be prevented. It is desirable, however, to arrange that the respective holding members, when they are tilted fully forwardly, will not hit the windshield 15'. This is because of the consideration of preventing the windshield 15' from being broken.

Furthermore, all of the mirrors are arranged, in this example, so as to be supported by the frame 12' of the glass pane 11'. Accordingly, the rear view mirror apparatus of this example can be attached or detached while assembled as an integral unit. Thus, this apparatus is quite convenient for attaching to the body of the vehicle.

FIGS. 11 and 12 show a sixth example of a periscope-type rear view mirror apparatus according to the present invention.

The arrangement of the objective mirror 20' and the holding member 21' is identical with that of the fifth example. The difference lies in the arrangement of the first reflecting mirror 30' and the second reflecting mirror 40'.

More specifically, the holding member 31' of the first reflecting mirror 30' is hinged, at its rear end, to the respective lower ends of a pair of stays 50' which, in turn, are hinged to the respective supporting lugs 14' which project downwardly from rearward sites along the edges of the frame 12'. The holding member 41' of the second reflecting mirror 40', on the other hand, is hinged, at its lower end, to the forward end of the holding member 31' of the first reflecting mirror 30'.

Still more specifically, the stays 50' are fastened, by bolts 52' and via washers 51' made of a resin, to the supporting lugs 14' on the inner sides of these lugs. Edges of the holding member 31' extend rearwardly to provide two parallel, flat lugs 32'. These lugs 32' are fastened, by bolts 34' and via washers 33', to the lower ends of the stays 50' on the outer sides of these stays. Also, the edges of the holding member 31' extend forwardly to provide two parallel, flat lugs 35'. The edges of the holding member 41' extend downwardly to provide two parallel, flat lugs. These lugs are fastened, by bolts 44' and via washers, to lugs 35' on the inner sides of these latter lugs.

The holding member 41' is provided with a knob 47' to facilitate angular adjustment of this holding member.

Because of this arrangement, the vertical angles of both the first reflecting mirror 30' and the second reflecting mirror 40' can be freely adjusted in the same way as described in connection with Example 5. Thus, there is insured safety at the time of, for example, an accident.

The rear view mirror apparatus of this instant example is provided with a filter 60' to give an anti-glare effect. More specifically, the filter 60' is comprised of a rectangular frame which holds therein a film formed by an evaporation-deposition technique so as to have a predetermined light transmittancy. The edges of this frame extend downwardly to provide a pair of lugs 61'.

These lugs 61' are hinged, by bolts 62' and via washers 63', to substantially central portions of the pair of stays 50'. The structure is arranged so that when the frame is tilted downwardly, the upper edge of the frame is brought into contact with the upper edge of the holding member 41' of the second reflecting mirror 40' to thereby block the path of the light rays from the objective mirror 20' to the first reflecting mirror 30', thus lowering the light-reflecting rate of this rear view mirror apparatus as a whole to a desirable value of 10–15%. This arrangement also includes the function that, when the filter frame is turned upwardly, the filter is positioned between the two stays 50' so that the filter will not shut off the path of light rays. Furthermore, in order to keep this filter from turning spontaneously or from vibrating in accordance with the vibrations of the body of the vehicle, magnets 64' and 65' are provided on the upper edge of the holding member 41' and between the pair of stays 50', respectively, so that the frame may be held in either one of these positions.

In this example, the first reflecting mirror 30' and/or the second reflecting mirror 40' can be used as ordinary rear view mirrors by merely adjusting the hinges.

As has been made clear from the foregoing examples, the periscope-type rear view mirror apparatus according to the present invention can be used also as an ordinary rear view mirror and thus it is quite advantageous in actual use. Furthermore, when the apparatus is used as an ordinary rear view mirror, the objective mirror and reflecting mirror can both be folded to prevent an undesirable increase of resistance to air pressure during driving. Thus, the periscope-type rear view mirror apparatus according to the present invention is quite advantageous from the viewpoint of safety also, as stated above.

We claim:

1. A periscope-type rear view mirror apparatus for an automobile, said automobile having a roof, said roof having an aperture therein, said apparatus comprising:
    a frame supporting a glass pane, said frame positioned to cover said aperture with said glass pane, said frame having first and second pairs of parallel, flat lugs integral therewith and respectively extending upwardly and downwardly from the forward portions of the opposed lateral edges thereof;
    a housing hingedly connected to said pair of upwardly extending lugs of said frame and adapted to be movable from a first position against said roof to a second position away therefrom;
    a roof-type planar objective mirror positioned above said aperture and supported by said housing for reflecting light rays received from the rear of the automobile forwardly and downwardly through said glass pane into the interior of the automobile when said housing is in said second position, said objective mirror being against said roof when said housing is in said first position;
    first and second mirror holding members; said second mirror holding member having upwardly extending side portions constituting two parallel, flat lugs and having downwardly extending side portions constituting two parallel, flat lugs; said first mirror holding member having forwardly extending side portions constituting two parallel, flat lugs; said upwardly extending lugs of said second mirror holding member being rotatably secured to said pair of downwardly extending lugs of said frame to provide means for allowing free rotation of said second mirror holding member with respect to said frame; said forwardly extending lugs of said first mirror holding member being rotatably secured to the downwardly extending lugs of said second mirror holding member to provide means for allowing free rotation of said first mirror holding member with respect to said second mirror holding member;
    a first planar reflecting mirror positioned on said first mirror holding member for reflecting the light rays reflected from said objective mirror upwardly and forwardly; and
    a second planar reflecting mirror positioned on said second holding member and adjacent said first reflecting mirror for reflecting the light rays reflected from said first reflecting mirror to the position of a driver's eyes.

2. An apparatus as claimed in claim 1, wherein said first mirror holding member is sufficiently rotatable with respect to said second mirror holding member to be movable to a position wherein said first planar reflecting mirror comprises means for reflecting light rays passing through a rear window of the automobile directly to the position of a driver's eyes.

* * * * *